(12) United States Patent
Odagi

(10) Patent No.: US 8,136,444 B2
(45) Date of Patent: Mar. 20, 2012

(54) METHOD FOR PRESSING AND FORMING A RAW MATERIAL INTO A GRANULATED MATERIAL AND AN APPARATUS THEREOF

(75) Inventor: Katsuaki Odagi, Toyokawa (JP)

(73) Assignee: Sintokogio, Ltd., Aichi (JP)

( * ) Notice: Subject to any disclaimer, the term of this patent is extended or adjusted under 35 U.S.C. 154(b) by 307 days.

(21) Appl. No.: 12/523,128

(22) PCT Filed: Dec. 18, 2007

(86) PCT No.: PCT/JP2007/074286
§ 371 (c)(1),
(2), (4) Date: Jul. 14, 2009

(87) PCT Pub. No.: WO2008/093476
PCT Pub. Date: Aug. 7, 2008

(65) Prior Publication Data
US 2010/0071571 A1 Mar. 25, 2010

(30) Foreign Application Priority Data
Jan. 30, 2007 (JP) ................................. 2007-018824

(51) Int. Cl.
*B29C 43/50* (2006.01)
*B30B 3/04* (2006.01)
*B28B 1/28* (2006.01)

(52) U.S. Cl. .......... 100/35; 100/176; 425/236; 425/237; 425/362; 264/310

(58) Field of Classification Search .................... 100/35, 100/155 R, 176; 425/236, 237, 357, 362, 425/363; 264/310
See application file for complete search history.

(56) References Cited

U.S. PATENT DOCUMENTS

| 492,206 | A | * | 2/1893 | Hunter et al. | 425/89 |
| 4,957,425 | A | * | 9/1990 | Fay | 425/362 |
| 5,411,390 | A | * | 5/1995 | Fay | 425/145 |
| 5,462,425 | A | * | 10/1995 | Kuss et al. | 425/183 |

FOREIGN PATENT DOCUMENTS

| JP | 43-20237 | 8/1968 |
| JP | 2001-299226 | 10/2001 |

* cited by examiner

*Primary Examiner* — Jimmy T Nguyen
(74) *Attorney, Agent, or Firm* — Finnegan, Henderson, Farabow, Garrett & Dunner, L.L.P.

(57) ABSTRACT

A method and apparatus for pressing and forming a raw material into a granulated material having a uniform shape by a pair of rolls (1, 2), wherein at least one of the rolls of the pair of rolls has a predetermined number of holes (16) for forming the granulated material on an outer surface thereof, and pressing pins (17), which are inserted into respective holes, and a predetermined number of members (18) for supporting the pins installed in the one of the rolls of the pair of rolls, the members for supporting the pressing pins being configured to be separate from the pressing pins so that the pressing pins slide on the members for supporting the pressing pins; and wherein the granulated material is ejected by the pressing pins as the pressing pins slide on the members for supporting the pins.

5 Claims, 5 Drawing Sheets

METHOD FOR PRESSING AND FORMING A RAW MATERIAL INTO A GRANULATED MATERIAL AND AN APPARATUS THEREOF

TECHNICAL FIELD

The present invention relates to a method for pressing and forming a raw material into a granulated material and the apparatus thereof. More particularly, it relates to a method for producing the granulated material, such as tablets and briquettes, by pressing and forming a raw material, such as a powdery material, by a pair of rolls, and to the apparatus.

BACKGROUND ART

Conventionally, a press type apparatus for forming a raw material into a granulated material, such as the one disclosed in Japanese Utility Model Publication No. S43-20237, is used. The apparatus comprises a rotary drum that has many holes on its outer surface. A plurality of pins (or rams) that are connected to a rod for moving the pins are inserted into, and can be removed from, the holes. The pins are moved back and forth by the rod in the radial direction of the drum to press and form the raw material into the granulated material and to take the granulated material out of the holes. The pins are pivotably inserted into a cover on the rod.

DISCLOSURE OF INVENTION

In the apparatus there is just a very small clearance of the pins with the holes or the cover. Thus any displacement of the pins (in the circumferential direction of the drum) is not absorbed by the clearance during the steps of pressing and forming the raw material into the granulated material and taking the granulated material out of the holes. Further, if the number of rods for moving the pins were to be increased, they would interfere with each other. Thus the number of pins is limited, and so production by the apparatus cannot greatly increase. These are problems.

The present invention has been conceived to solve the problems. The purpose of the present invention is to provide a method for pressing and forming a raw material into a granulated material and an apparatus thereof. The method allows the pins to slide in the circumferential direction. It also allows many pins to be installed to increase the production. By using the method tablets that have uniform shapes are produced.

The present invention relates to a method for pressing and forming a raw material into a granulated material by using a pair of rolls. In the method at least one of the rolls in the pair has on its outer surface a predetermined number of holes for forming the granulated material. Pressing pins that are inserted into the holes and a predetermined number of members for supporting the pins are installed in the roll. The members for supporting the pins are configured to be separate from the pins so that the pins can slide on the members. The granulated material that is pressed and formed is ejected by the pins as the pins slide on the members.

The present invention also relates to a method for pressing and forming a raw material into a granulated material by using a pair of rolls. The method comprises the step of feeding the raw material into a space between the pair of rolls. The rolls have a predetermined number of holes for forming the granulated material on their outer surfaces. Pressing pins that are inserted into the holes and a predetermined number of members for supporting the pins are installed in the rolls. The members for supporting the pins are configured to be separate from the pins so that the pins can slide on the members. The method also comprises the step of pressing and forming the raw material into the granulated material by the pair of rolls. It also comprises the step of ejecting the granulated material that is pressed and formed by the pins as the pins slide on the members for supporting the pins.

Further, the present invention relates to a press type apparatus for forming a raw material into a granulated material by using a pair of rolls. In the apparatus at least one roll of the pair of rolls has on its outer surface a predetermined number of holes for forming the granulated material. Pressing pins that are inserted into the holes and a predetermined number of members for supporting the pins are installed in the roll. The members for supporting the pins are configured to be separate from the pins so that the pins can slide on the members.

The present invention also relates to a press type apparatus for forming a raw material into a granulated material by using a pair of rolls. The apparatus comprises a pair of rolls. In the rolls, pressing pins, a predetermined number of members for supporting the pins, and a pressing means for radially pressing the pins and the members, are installed. The pins are inserted into a predetermined number of holes for pressing and forming the raw material into the granulated material. The holes are disposed on the outer surfaces of the rolls. The members for supporting the pins are configured to be separate from the pins. The apparatus also comprises a feeding means for feeding the raw material into a space between the pair of rolls.

By the present invention the granulated material is ejected by the pressing pins as the pins slide on the members for supporting the pins since the pins and the members that are configured to be separate from the pins are installed in the roll. Thus sliding on the circumference of the pins can occur. Since the numbers of both the pins and the members for supporting the pins can greatly increase, the production can greatly increase. Further, tablets that have uniform shapes can be produced.

The basic Japanese patent application, No. 2007-018824, filed Jan. 30, 2007, is hereby incorporated in its entirety by reference into the present application.

The present invention will become more fully understood from the detailed description given below. However, the detailed description and the specific embodiment are illustrations of desired embodiments of the present invention, and are described only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present invention in the sense of the doctrine of equivalents.

The use of the articles "a," "an," and "the" and similar referents in the specification and claims are to be construed to cover both the singular and the plural, unless otherwise indicated herein or clearly contradicted by the context. The use of any and all examples, or exemplary language (e.g., "such as") provided herein, is intended merely to better illuminate the invention, and so does not limit the scope of the invention, unless otherwise claimed.

BEST MODE FOR CARRYING OUT THE INVENTION

Figure 1:
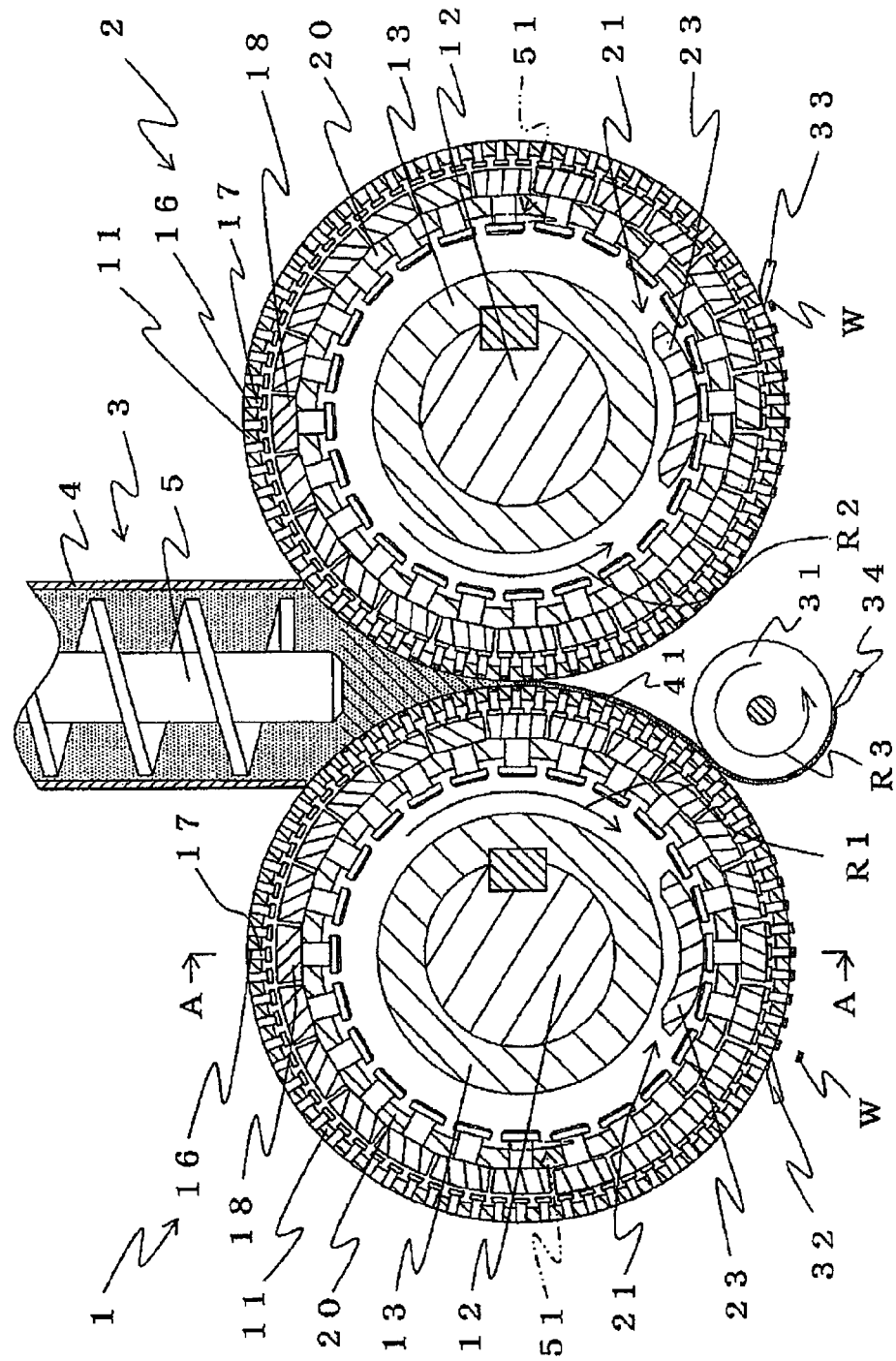
FIG. 1 is a sectional view of the main part of an embodiment of the press type apparatus for forming the powdery material into the granulated material of the present invention.
Figure 2:
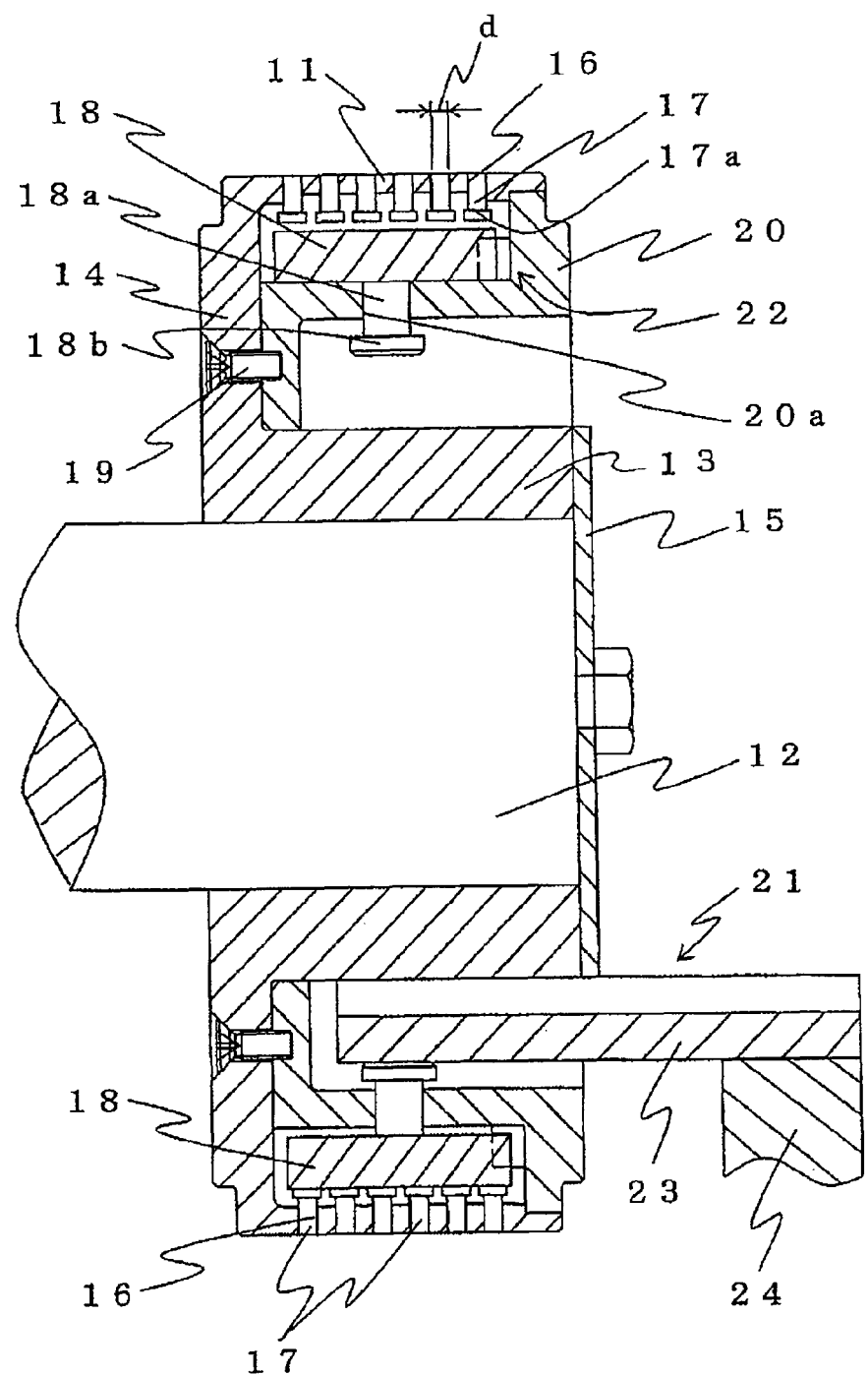
FIG. 2 is a sectional view at line A-A of FIG. 1.
Figure 3:
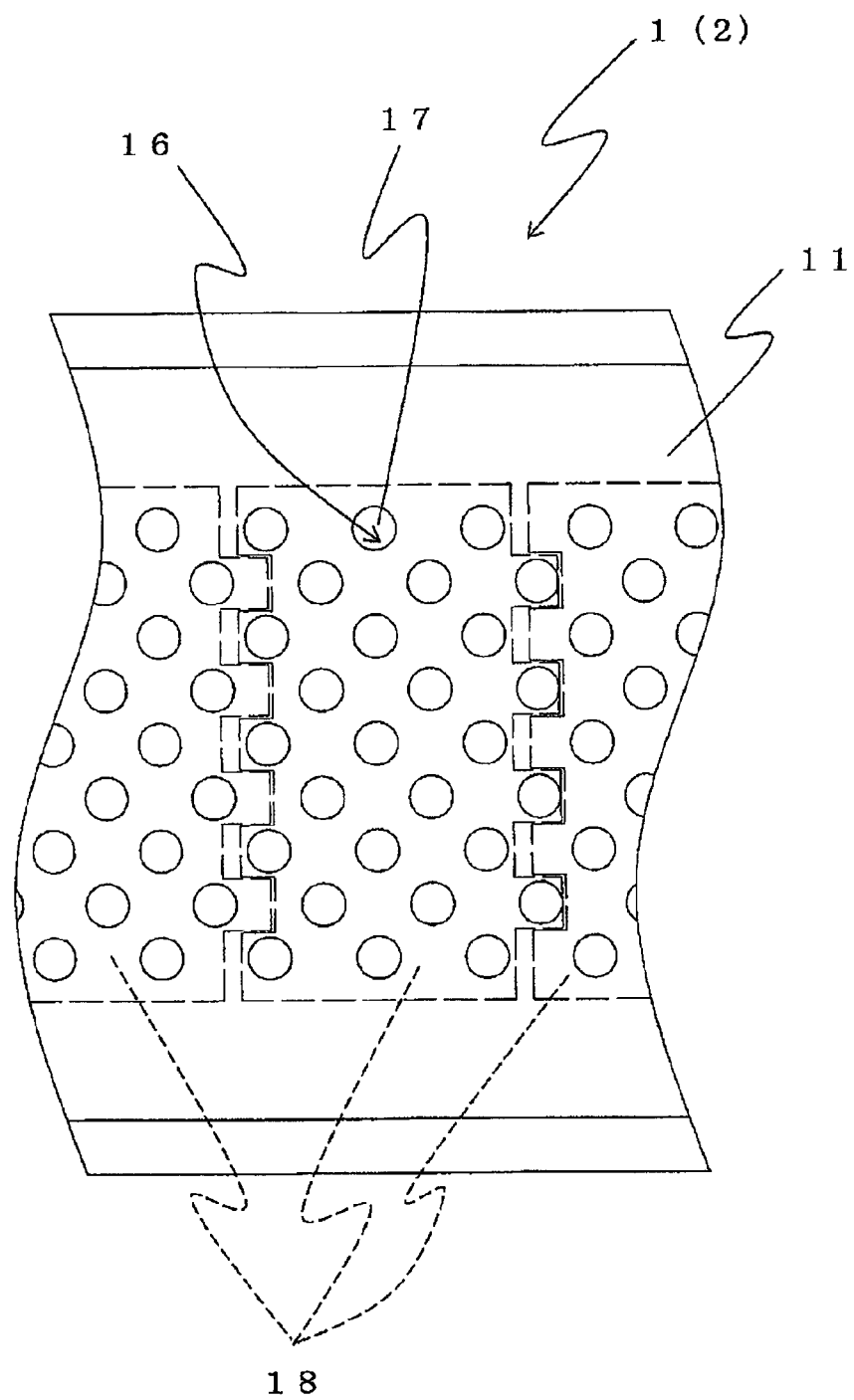
FIG. 3 is a plan view of FIG. 1 where a part of the roll is removed.
Figure 4:
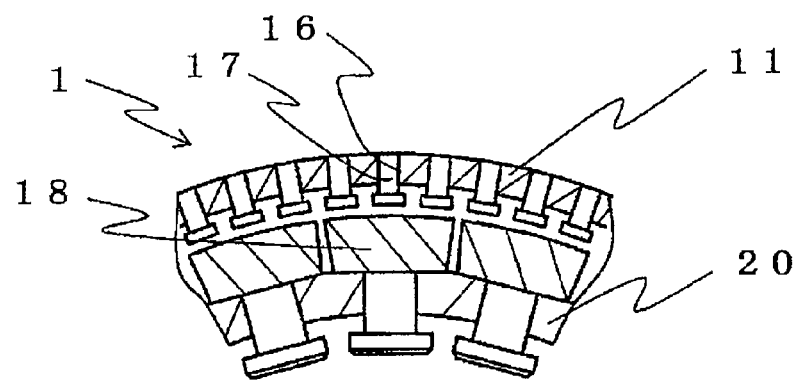
FIG. 4 is an enlarged view of the top part of the left roll of FIG. 1.

Below, a method for pressing and forming a raw material into a granulated material and the apparatus thereof are described based on the drawings. The embodiment of the apparatus is a press type apparatus for forming a raw material such as a powdery material into a granulated material as shown in FIGS. 1 and 2. It comprises a pair of rolls 1, 2, wherein each of the rolls has a cylindrical shape and they are arranged to face each other. Further, both rolls 1, 2 can rotate toward their inner sides as shown by the arrows R1, R2. The apparatus further comprises a screw feeder 3 as a feeding means for feeding the powdery material to a space between the rolls 1, 2. The screw feeder 3 is disposed above the rolls 1, 2. The screw feeder 3 comprises a hopper 4 for feeding the raw material, a screw 5 for pressing the raw material, and a driving motor (not shown) for driving the screw 5. The screw 5 is disposed in the hopper 4.

The rolls 1, 2 can be rotated by means of electric motors and reducers (not shown) so that the speeds of the outer surfaces of the rolls 1, 2 differ. Each of the rolls 1, 2 comprises the body of the roll and a mechanism for ejecting the granulated material, which mechanism is installed in the body of the roll. The body of the roll comprises a peripheral section 11 having a cylindrical shape, a boss section 13 having a cylindrical shape and connected to a rotary shaft 12, and a connecting section 14. The connecting section 14 connects the peripheral section 11 and the side end of the boss section 13 (the left end of it in FIG. 2). In FIG. 2 the number 15 denotes a holding member for preventing the boss sections 13 of the rolls 1, 2 from disengaging from the rotary shafts 12. As shown in FIGS. 1-4, a predetermined number of holes for forming the granulated material are formed in the peripheral section 11. The holes are arranged in the radial directions of the rolls 1, 2.

The mechanism for ejecting the granulated material comprises pressing pins (pistons) 17, a predetermined number of members 18 for supporting the pins, a retaining member 20, and an ejecting means 21. The pressing pins 17 are inserted into, and can be removed from, the holes 16. The members 18 for supporting the pins not only push the pressing pins 17 but also support them when forming the granulated material. The members 18 are configured to be separate from the pins 17. The retaining member 20 is fixed to the connecting section 14 by fixing screws 19 to keep the members 18 in the body of the roll. The ejecting means 21 ejects the tablets from the holes 16 by using the pressing pins 17 and the members 18 for supporting the pins after the tablets are formed. Each of the members 18 for supporting the pins separately supports a predetermined number of the pressing pins 17. In this embodiment each of the rolls 1, 2 has 24 members 18 for supporting the pins and each has 432 pins 17. The number of pins 17 is the same as that of the holes 16. Each member 18 for supporting the pins is configured to support 18 pins 17. The pins 17 are configured to be separate from the members 18 for supporting the pins. When the diameter of the holes is assumed to be d mm, the pitch of the pins 17 in the circumferential direction can be 1.01 d-10 d mm and that in the longitudinal direction can be 1.01 d-10 d mm on the outer surfaces of the rolls 1, 2, regardless of the diameters of the rolls 1, 2. Thus the number of pressing pins 17 can be increased over that of a conventional apparatus. If the pitch of the pins 17 were smaller than 1.01 d mm, the distance between the neighboring holes 16 would be so narrow that those parts of the rolls 1, 2 would be weakened. If the pitch of the pins 17 were greater than 10 d mm, the number of pins would decrease so that the production would be reduced. From the viewpoints of the production and the strength, the pitch of the pins 17 is preferably 1.1 d-5 d mm.

The pins 17 are arranged in the radial direction of the rolls 1, 2 and slide a predetermined distance. The pins 17 have a stepped section 17a to prevent them from slipping out of the rolls 1, 2 while being ejected.

The retaining member 20 has holes 20a, of which the number is the same as that of the members 18 for supporting the pins. The holes 20a are arranged in the radial direction of the rolls 1, 2. The necks 18a of the members 18 for supporting the pins are inserted into the holes 20a so as to allow the members 18 to slide. Stepped sections 18b are formed at the ends of the necks 18a of the members 18 for supporting the pins to pull the members 18 back by means of pulling members 51. Below the pulling members 51 will be described.

The members 18 for supporting the pins engage with engaging sections 22 by means of concavo-convex engagements (clearance fits) so that they freely move in the radial direction of the rolls 1, 2. The engaging sections 22 are connected to the retaining members 20. The engaging sections 22 prevent the members 18 from rotating about the necks 18a.

The ejecting means 21 is disposed at the near side (the upstream side) of the position in the rolls 1, 2, namely, where the granulated material W is ejected from the holes 16. It comprises a pushing member 23 for pushing out the pressing pins 17 by the members 18 for supporting the pins. It also comprises a supporting member 24 for supporting the pushing member 23. The part of the pushing member 23 that contacts the members 18 for supporting the pins is configured to have a smooth curvature.

For the roll press type apparatus for forming the granulated material of the present invention, the diameter of each of both rolls 1, 2 is 115 mm. Further, the holes 16 for forming the granulated material have an inner diameter of 2 mm. The pressing pins 17 and the members 18 for supporting the pins can move 1 mm in the radial direction.

As shown in FIG. 1, at the oblique and lower position of the roll 1, an auxiliary roll 31 is disposed so that its outer surface faces that of the roll 1. It has a cylindrical shape and is arranged in parallel to the roll 1. It rotates in the opposite direction of that of the roll 1, as shown by the arrow R3 in FIG. 1, so that the speed of the surface of it is faster than that of the roll 1. The numbers 32, 33, and 34 in FIG. 1 denote scrapers that are fixed against the surfaces of the rolls 1, 2 and the auxiliary roll 31, respectively. The scrapers 32, 33 scrape the tablets that are ejected out of the outer surfaces of the rolls 1, 2 by the pressing pins 17 so that the tablets are taken out as finished products. The scraper 34 scrapes the burrs that adhere to the auxiliary roll 31.

Figure 5:
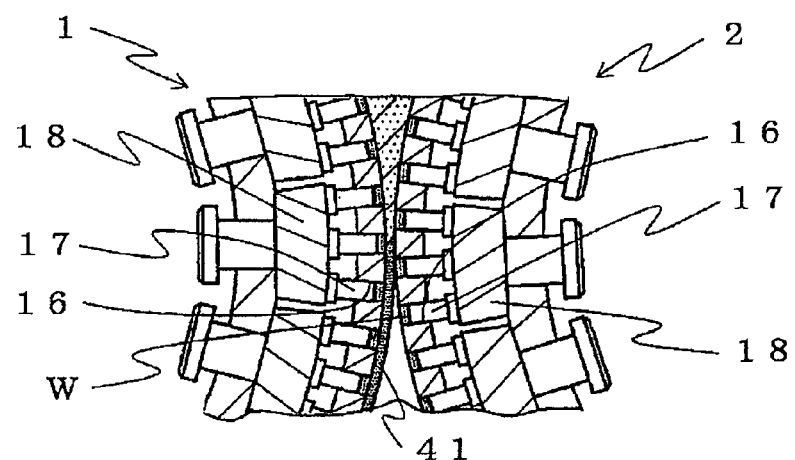
FIG. 5 is an enlarged view of the part of the pair of rolls of FIG. 1 where the raw material is pressed and formed into the granulated material.

For the roll press type apparatus for forming the granulated material having the technical features explained in the above paragraphs, the outer surface of the roll 1 rotates at a speed of 0.018 m/sec, and the outer surface of the roll 2 rotates at a speed of 0.012 m/sec, in the direction shown by the arrows R1, R2 in FIG. 1, respectively. After the screw feeder 3 starts to be driven, a powdery material is poured in the screw feeder 3, and then it is fed into the space between the rolls 1, 2. As shown in FIGS. 1 and 5, the powdery material is pressed and formed in the holes 16 of the rolls 1, 2 into the tablets that have a cylindrical shape and that are short. Then, since the difference between the speed of the outer surface of the roll 1 and that of the roll 2 generates a shearing force on the outer surface of the pressed and formed tablets, the burrs 41, which are the powdery material that is not used for the tablets, adhere to the roll 1, of which the surface rotates faster than that of the roll 2.

Figure 6:
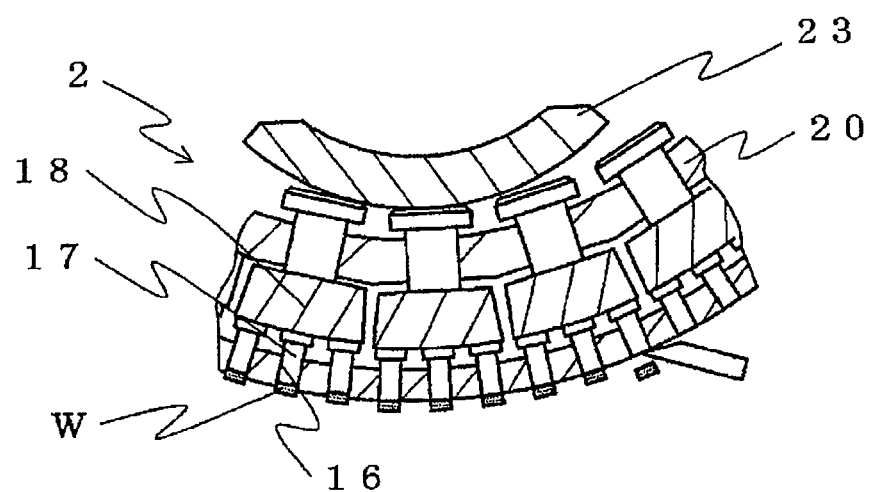
FIG. 6 is an enlarged view of the part of the right roll where the pressing pins are pushed.

After the burrs of the tablets W disposed in the holes 16 of the roll 2 are removed, the tablets move to the ejecting means 21. As shown in FIGS. 1 and 6, since the plurality of the pressing pins 17 are pushed by the members 18 for supporting the pins that are pushed by the pushing member 23 by means of the rotation of the roll 2, the tablets W in the plurality of the holes 16 are sequentially ejected from the holes 16. The pressing pins 17 contact the members 18 for supporting the pins and slide on them. Since the pins 17 do not directly contact the pushing member 23 and do not receive the circumferential frictional force generated by the rotation of the rolls 1, 2, the displacement of the pins 17 in the circumferential direction is eliminated. Therefore any trouble of a bite of the pins 17 with the holes 16 that is caused by the displacement of the pins 17 is resolved. Also, the deformation of the tablets W due to the concentration of the powdery material at one side, which is caused by the displacement of the pins 17, is suppressed. Since all of the holes 16 are disposed in the radial direction along the curvature of the surfaces of the rolls 1, 2, the shape of the outer end of each of the tablets W is uniform. Thus, tablets W with a uniform shape are produced.

In contrast, the tablets that are formed in the holes 16 of the roll 1 have burrs around them and move to the position where the auxiliary roll 31 is located. Then, the burrs are removed from the tablets by the auxiliary roll 31, which rotates in the direction shown by the arrow R3 at a speed that is faster than that of the roll 1. Then, the tablets W are produced in the same way as that explained for the roll 2.

After ejecting the tablets W, the members 18 for supporting the pins are pushed back by the pins 17 by means of the pressure of the raw material in the next cycle. If the pressure of the raw material is not large enough to push back the pins 17, the pulling member 51 may be equipped to force the members 18 back to the initial positions. The pulling member 51 has a crescent shape or a wedge shape, thereby to pull a stepped section 18b of the members 18 for supporting the pins by a similar mechanism as that of the pushing members 23 or any known mechanism. The members 18 are pulled in the inward radial direction of the rolls 1, 2.

For this embodiment, the pressing pins and the members for supporting the pins are installed in the pair of rolls, wherein the members are configured to be separate from the pins so that the pins slide on the members. However, the present invention is not limited to this technical feature. The pressing pins and the members for supporting the pins may be installed in only one roll of the pair of rolls, wherein the members are configured to be separate from the pins so that the pins slide on the members.

For this embodiment, each of the predetermined number of the members for supporting the pins supports the predetermined number of the pins separately. However, the number of members or that of pins may be determined based on the diameters of the rolls, the sizes, shapes, or disposition of the pins, and so on.

For this embodiment, the speeds of the outer surfaces of the pair of rolls differ, thereby to simultaneously generate a pressing force and a shearing force. Thus, if the raw material that contains a fibrous component that is strong at some level is used, it is solidified while the fiber component is being separated from it. Consequently tablets that have an accurate size are effectively produced.

However, depending on the raw material the speeds of the outer surfaces of the pair of rolls may be the same.

The invention claimed is:

1. A method for pressing and forming a raw material into a granulated material by a pair of rolls, the method comprising the steps of:
    feeding a raw material into a space between a pair of rolls that have a predetermined number of holes for forming the granulated material on an outer surface thereof, wherein pressing pins, which are inserted into respective holes, and a predetermined number of members for supporting the pressing pins are installed in the rolls, the members for supporting the pressing pins being configured to be separate from the pressing pins so that the pressing pins slide on the members for supporting the pressing pins;
    pressing and forming the raw material into the granulated material by the pair of rolls; and
    ejecting the granulated material by the pressing pins as the pressing pins slide on the members for supporting the pressing pins.

2. The method for pressing and forming a raw material into a granulated material of claim 1, wherein each of the members for supporting the pressing pins separately supports a predetermined number of the pressing pins.

3. A press type apparatus for forming a raw material into a granulated material by a pair of rolls, the apparatus comprising:
    a pair of rolls in which pressing pins, which are inserted into respective holes for forming the granulated material, which holes are formed in a predetermined number on an outer surface of the rolls, a predetermined number of members for supporting the pressing pins, which members are configured to be separate from the pressing pins, and an ejecting means for pushing out the pressing pins and the members for supporting the pressing pins in a radial direction of the rolls, are installed; and
    a feeding means for feeding the raw material to a space between the pair of rolls.

4. The press type apparatus for forming a raw material into a granulated material of claim 3, wherein each of the members for supporting the pressing pins separately supports a predetermined number of the pressing pins.

5. The press type apparatus for forming a raw material into a granulated material of claim 3, further comprising an auxiliary roll that is disposed to face one of the rolls of the pair of rolls.

* * * * *